(12) United States Patent
Schneider

(10) Patent No.: US 6,883,825 B2
(45) Date of Patent: Apr. 26, 2005

(54) AIRBAG MODULE AND ASSEMBLY OF STEERING WHEEL AND AIRBAG MODULE

(75) Inventor: Michael Schneider, Niedernberg (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 0 days.

(21) Appl. No.: 10/637,111

(22) Filed: Aug. 8, 2003

(65) Prior Publication Data

US 2004/0041378 A1 Mar. 4, 2004

(30) Foreign Application Priority Data

Aug. 27, 2002 (DE) .................................. 202 13 145 U

(51) Int. Cl.⁷ .............................................. B60R 21/16
(52) U.S. Cl. ................................................ 280/728.2
(58) Field of Search ...................... 280/728.1, 728.2, 280/731

(56) References Cited

U.S. PATENT DOCUMENTS

| 4,785,144 | A | * | 11/1988 | Fosnaugh et al. ........ 200/61.55 |
| 5,207,544 | A | * | 5/1993 | Yamamoto et al. ......... 411/348 |
| 5,235,146 | A | | 8/1993 | Suzuki |
| 5,380,037 | A | | 1/1995 | Worrell et al. |
| 5,410,114 | A | | 4/1995 | Furuie et al. |
| 5,508,482 | A | | 4/1996 | Martin et al. |
| 5,624,130 | A | * | 4/1997 | Ricks ....................... 280/728.2 |
| 5,775,725 | A | * | 7/1998 | Hodac et al. ............ 280/728.2 |
| 6,082,758 | A | | 7/2000 | Schenck |
| 6,257,615 | B1 | * | 7/2001 | Bohn et al. ............... 280/728.2 |
| 6,364,344 | B1 | * | 4/2002 | Hudd et al. .............. 280/728.2 |
| 6,675,675 | B1 | * | 1/2004 | Sauer et al. ................... 74/552 |
| 2001/0048216 | A1 | | 12/2001 | Varcus et al. |

FOREIGN PATENT DOCUMENTS

| GB | 2270657 | 3/1994 | |
| JP | 04287768 A | * 10/1992 | ............ B62D/1/04 |
| JP | 09058393 | 3/1997 | |
| WO | WO 00/02752 | 1/2000 | |

* cited by examiner

Primary Examiner—Faye M. Fleming
(74) Attorney, Agent, or Firm—Tarolli, Sundheim, Covell & Tummino L.L.P.

(57) ABSTRACT

An airbag module for installation into a steering wheel including a gas generator carrier (18) and a covering cap (16) which are connected with each other by a snap connection (22). The gas generator carrier (18) has first projections (28) and the covering cap (16) has second projections (26) each associated to one of the first projections (28). One of the first projections (28) of the gas generator carrier (18) and an associated one of the second projections (26) of the covering cap (16) form a common extension (24) which receives a first end (30a) of a helical spring (30). There is further proposed an assembly of a steering wheel (10) and such airbag module (14).

11 Claims, 1 Drawing Sheet

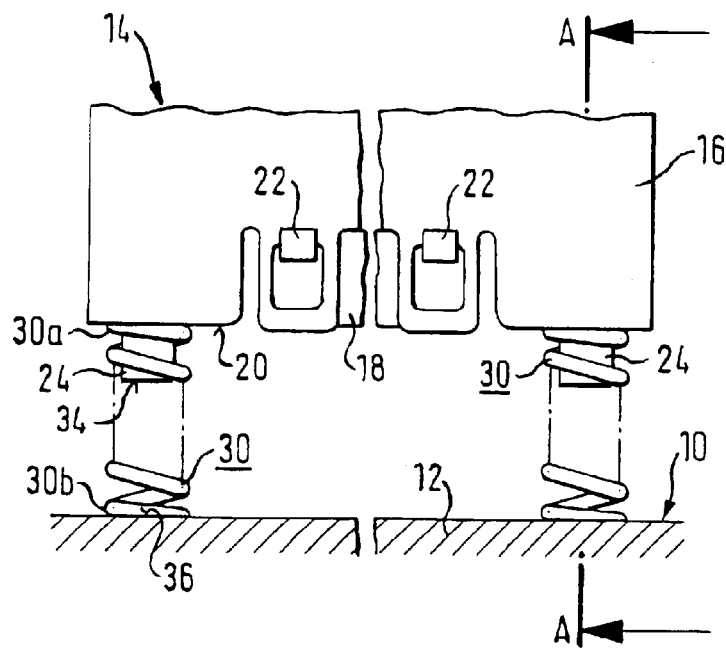
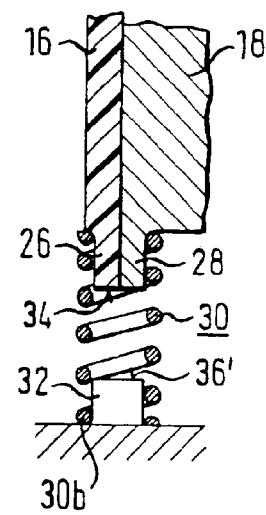
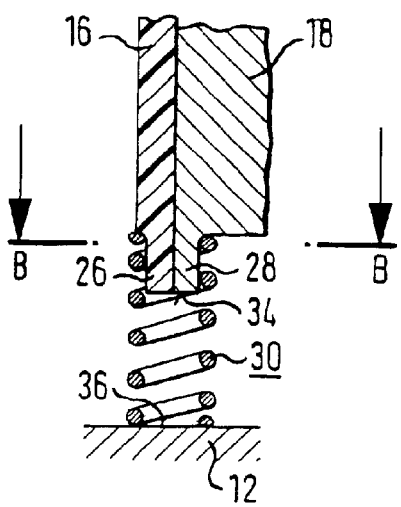
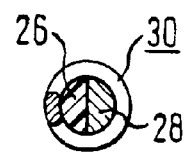

AIRBAG MODULE AND ASSEMBLY OF STEERING WHEEL AND AIRBAG MODULE

TECHNICAL FIELD

The invention relates to an airbag module for installation in a steering wheel. The invention further relates to an assembly of a steering wheel and such airbag module.

BACKGROUND OF THE INVENTION

Known airbag modules usually have a gas generator carrier and a covering cap connected with each other by rivet or screw connections. A snap connection is a more favorably-priced way of fastening the covering cap to the module. However, such snap connections generally have to be secured by additional elements in order to rule out a possible disengaging of the snap connection.

BRIEF SUMMARY OF THE INVENTION

The invention provides an airbag module with a gas generator and a covering cap fastened thereon, which is successful without additional securing elements.

According to the invention, an airbag module for installation into a steering wheel comprises a gas generator carrier and a covering cap which are connected with each other by a snap connection. The gas generator carrier has first projections and the covering cap has second projections each associated to one of the first projections. One of the first projections of the gas generator carrier and an associated one of the second projections of the covering cap form a common extension which receives a first end of a helical spring. Helical springs are favorably-priced structural elements which are usually used for restoring the airbag module in the steering wheel after a pressing down of the entire airbag module to actuate the horn. The helical springs are additionally used, in accordance with the invention, to prevent a disengagement of the snap connection between the gas generator carrier and the covering cap, i.e. the helical springs undertake the functions of readjusting the airbag module and securing the snap connection between the gas generator carrier and the covering cap. Through the saving on additional securing elements which is thus achieved, the installation is simplified, and the installation costs can be reduced. The additional expenditure for forming the necessary projections in the gas generator carrier and in the covering cap is negligible.

Preferably, the extensions are provided on the underside of the airbag module, which underside opposes a region adjoining the steering wheel hub.

A secure mounting of the helical springs is ensured in that the diameter of the extensions is greater than the internal diameter of the associated helical springs, or in that the extensions have a bead.

According to the preferred embodiment, at least one of the extensions has a contact surface for establishing an electrical contact, so that via the extension the contact can be introduced for triggering the horn signal.

The invention also provides an assembly of a steering wheel and an airbag module proposed.

Advantageous developments of the assembly are set out in the subclaims 7 to 11.

BRIEF DESCRIPTION OF THE DRAWINGS

FIG. 1 shows an airbag module according to the invention, arranged on a steering wheel;

FIG. 2 shows a sectional view along line A—A in FIG. 1;

FIG. 3 shows a sectional view along line B—B in FIG. 2; and

FIG. 4 shows a sectional view of a variant embodiment corresponding to the illustration of FIG. 2.

DETAILED DESCRIPTION OF THE PREFERRED EMBODIMENTS

In FIG. 1, an airbag module 14 is illustrated diagrammatically, arranged on a steering wheel 10 (of which only a region 12 adjoining the steering wheel hub is shown). The airbag module 14 comprises a covering cap 16 and a gas generator carrier 18 of plastic (see also FIG. 2). The covering cap 16 surrounds the gas generator carrier 18 substantially completely, with the exception of the underside 20 of the airbag module 14 opposing the region 12 of the steering wheel 10. The covering cap 16 is connected with the gas generator carrier 18 via several snap connections 22 lying adjacent to each other and provided on the side walls of the gas generator carrier 18 and of the covering cap 16.

On the underside 20 of the airbag module 14, there are formed extensions 24 which point in the direction toward the region 12. The extensions 24, as can be seen in FIGS. 2 and 3, are each composed of a projection 26 of the covering cap 16 and a projection 28 of the gas generator carrier 18. Each extension 24 receives a helical spring 30, which rests with its first end 30a against the underside of the airbag module and with its second end 30b rests against a surface which is formed on the region 12 of the steering wheel 10. The diameter of an individual extension 24 has either an overmeasure in relation to the associated helical spring 30, or is provided with a corresponding bead (not shown), so that the helical spring 30 is held securely on the extension 24. The helical springs 30 are designed such that in the case of dynamic loads, such as may occur for instance in an accident, they do not slip off from the extensions 24 or get detached in another way, for example by radial widening.

The helical springs 30 fulfill a dual function. On the one hand, they serve for restoring the airbag module 14, when the entire module 14—by pressure onto the covering cap 16—is pressed down in the direction towards the region 12 to trigger a horn signal. On the other hand, the helical springs 30 lock the connection between the covering cap 16 and the gas generator carrier 18. The helical springs 30 hold the projections 26 and 28 of the covering cap 16 and of the gas generator 18, respectively, together and therefore prevent a lateral displacement between the gas generator carrier 18 and the covering cap 16, in particular during an accident. In the direction of the longitudinal axes of the extensions 24, the covering cap 16 is retained on the gas generator carrier 18 by the snap connections 22.

In the variant embodiment illustrated in FIG. 4, the helical springs 30 are also securely held at their second end 30b on corresponding extensions 32 formed on the steering wheel 10, so that the airbag module 14 is fastened to the steering wheel 10 solely by the helical springs 30, and the helical springs 30 alone undertake the guidance of the airbag module 14.

With a sufficient number of extensions 24 and helical springs 30, further fastening elements for arranging the airbag module 14 on the steering wheel 10 can be dispensed with entirely.

One or more of the extensions 24 provided on the underside 20 of the airbag module 14 can also be used for the construction of a horn contact. For this, the side of an extension 24, facing the region 12, is constructed as contact surface 34. If, by pressing down the airbag module 14, the contact surface 34 of the extension 24 and a contact surface 36 or 36', opposingly provided on the steering wheel 10 or on an extension 32 formed thereon (FIG. 4), respectively, are brought in contact with each other, a circuit is closed, which brings about the triggering of the horn signal.

What is claimed is:

1. An airbag module for installation on a steering wheel, said airbag module comprising a gas generator carrier (18) and a covering cap (16) which are connected with each other by a snap connection (22), characterized in that said gas generator carrier (18) has first projections (28) and said covering cap (16) has second projections (26) each associated with one of said first projections (28), one of said first projections (28) of said gas generator carrier (18) and an associated one of said second projections (26) of said covering cap (16) forming a common extension (24) which receives a first end (30a) of a helical spring (30).

2. The airbag module according to claim 1, characterized in that said extensions (24) are provided on an underside (20) of said airbag module (14), said underside opposing a region (12) adjoining a steering wheel hub.

3. The airbag module according to claim 1, characterized in that said extensions (24) have a diameter that is greater than an internal diameter of an associated one of said helical springs (30).

4. The airbag module according to claim 1, characterized in that said extensions (24) have a bead.

5. An assembly of a steering wheel (10) and an airbag module (14) comprising a gas generator carrier (18) and a covering cap (16) which are connected with each other by a snap connection (22), characterized in that said gas generator carrier (18) has first projections (28) and said covering cap (16) has second projections (26) each associated to one of said first projections (28), one of said first projections (28) of said gas generator carrier (18) and an associated one of said second projections (26) of said covering cap (16) forming a common extension (24) which receives a first end (30a) of a helical spring (30).

6. The assembly according to claim 5, characterized in that said helical springs (30) have a first end (30a) with which they rest against an underside (20) of said airbag module (14) and a second end (30b) with which they rest directly or indirectly against said steering wheel (10).

7. The assembly according to claim 6, characterized in that extensions (32) are formed on said steering wheel (10), on which said second ends (30b) of said helical springs (30) are received.

8. The assembly according to claim 7, characterized in that said airbag module (14) is fastened on said steering wheel (10) solely by said helical springs (30).

9. The assembly according to claim 7, characterized in that said helical springs (30) alone bring about a guidance of said air bag module (14) with respect to said steering wheel (10).

10. The assembly according to claim 5, characterized in that at least one contact surface (36, 36') is formed on said steering wheel (10), at a place opposing an extension (24) of said airbag module (14).

11. An airbag module for installation in a steering wheel, said airbag module comprising a gas generator carrier (18) and a covering cap (16) which are connected with each other by a snap connection (22), characterized in that said gas generator carrier (18) has first projections (28) and said covering cap (16) has second projections (26) each associated to one of said first projections (28), one of said first projections (28) of said gas generator carrier (18) and an associated one of said second projections (26) of said covering cap (16) forming a common extension (24) which receives a first end (30a) of a helical spring (30) wherein at least one of said extensions (24) has a contact surface (34) for establishing an electrical contact.

* * * * *